Dec. 16, 1930.  D. K. BLAKE  1,785,721
SYSTEM OF ELECTRIC DISTRIBUTION
Filed March 19, 1929
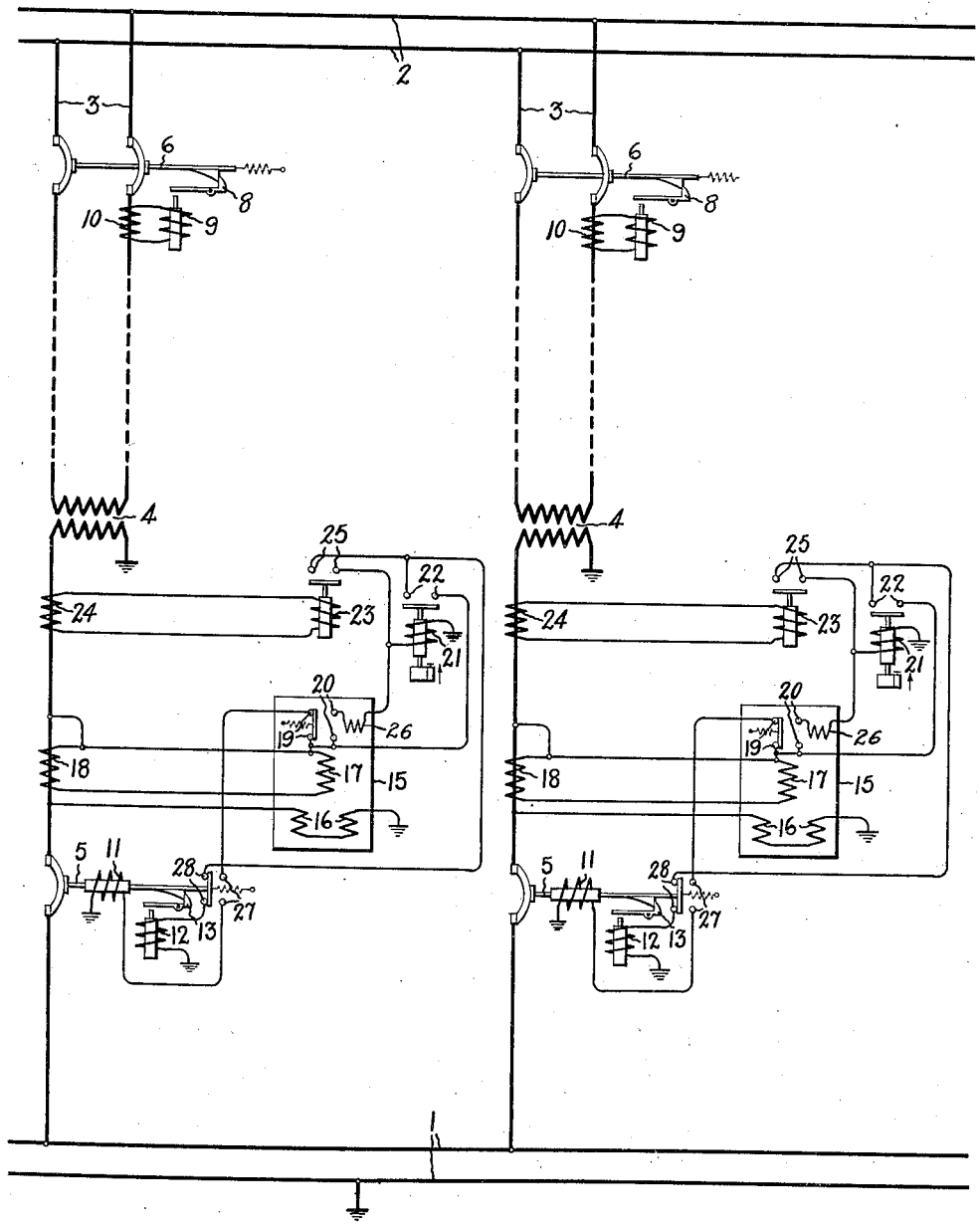
Inventor:
David K. Blake,
by Charles E. Tullar
His Attorney.

Patented Dec. 16, 1930

1,785,721

UNITED STATES PATENT OFFICE

DAVID K. BLAKE, OF SCOTIA, NEW YORK, ASSIGNOR TO GENERAL ELECTRIC COMPANY, A CORPORATION OF NEW YORK

SYSTEM OF ELECTRIC DISTRIBUTION

Application filed March 19, 1929. Serial No. 348,338.

My invention relates to systems of electric distribution and particularly to alternating current networks in which current is supplied thereto at various points by means of step-down transformers, the primary windings of which are connected to feeder circuits fed from the same or different sources of current. In such systems it is desirable to be able automatically to disconnect a transformer secondary from the network when the respective feeder circuit either is disconnected from its source of current or has a fault connected thereto and automatically to reconnect the transformer secondary to the network when the voltage of the respective feeder circuit is restored to normal.

For accomplishing this result, various arrangements employing a sensitive power directional relay responsive to the flow of power between the transformer secondary and the network have been used to effect the disconnection of the transformer. Due to the very sensitive reverse power setting of the relays required in order to effect, the disconnection of the transformer from the network when the transformer primary circuit is opened, heretofore in actual practice, it has been deemed necessary to provide suitable automatic synchronizing means which permits the transformer secondary to be reconnected to the network only when a predetermined relation exists between the network and transformer voltages.

One object of my invention is to provide an improved arrangement for controlling the connections between a transformer and a network in such a system whereby it is not necessary to provide an automatic synchronizing arrangement to control the reconnection of the transformer to the network.

In accordance with my invention, the power directional relay when operated in response to the flow of power from the network to the transformer, effects the operation of a suitable timing device which when energized for a predetermined time effects the disconnection of the transformer from the network. The transformer is arranged to be reconnected to the network in any suitable manner examples of which are well known in the art, such for example as in response to a predetermined secondary voltage of the transformer. By designing the timing device so that it has a rather long time setting, any periodic closing and opening of the circuit breaker between the transformer and the network can be made so slow as to be unobjectionable.

In order to effect the immediate disconnection of the transformer from the network when a fault occurs either in the transformer or in the primary circuit thereof, I also provide suitable overload responsive means for effecting the opening of the circuit breaker independently of the timing means when the current flowing from the network to the transformer exceeds a predetermined value.

My invention will be better understood from the following description taken in connection with the accompanying drawing and its scope will be pointed out in the appended claims.

Referring to the drawing which is a diagram of a network system embodying my invention, 1 is an alternating current network which is arranged to be supplied with energy from a suitable supply circuit 2 by means of a plurality of feeder circuits 3, two of which are shown in the drawing. In order to simplify the disclosure, single-phase circuits are shown but it is obvious that my invention is applicable to polyphase circuits.

Each feeder circuit 3 includes a step-down transformer 4 the low voltage secondary winding of which is arranged to be connected to the network by means of a suitable circuit breaker 5 and the primary winding of which is arranged to be connected to the supply circuit 2 by means of a suitable circuit breaker 6. The transformer 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit by means of a current transformer 10. Any suitable means, either manually or automatically controlled, may be provided for closing the circuit breaker.

The circuit breakers 5 may be of any suitable type, examples of which are well known in the art. As shown in the drawing, each circuit breaker is of the well known latched-in type and includes a closing coil 11 which when energized closes the circuit breaker and a trip coil 12 which when energized releases a latch 13 which holds the circuit breaker in its closed position.

In order to effect the opening of a circuit breaker 5 in the secondary circuit of a transformer 4 when the circuit breaker 6 in the primary circuit of the transformer is opened, each circuit breaker 5 has associated therewith a power directional relay 15 comprising a voltage winding 16 connected across the secondary winding of the transformer 4 and a current winding 17 which is connected to a current transformer 18 the primary winding of which is connected in series between the transformer secondary and the network. The power directional relays 15 are arranged so that when more than a predetermined small amount of power flows through the associated circuit breaker from the network to the transformer, the relays open their normally closed contacts 19 which are in an energizing circuit for the closing coil 11 of the associated breaker and close their contacts 20 which are in an energizing circuit for a time relay 21 which is associated therewith. The time relays 21 when energized for a predetermined length of time are arranged to close their respective contacts 22 and complete an energizing circuit for the trip coil 12 of the associated circuit breaker 5 to effect the opening thereof.

In order that a circuit breaker 5 may be opened immediately in case of a fault in the associated step-down transformer or feeder circuit, each circuit breaker has associated therewith an overcurrent relay 23 which is connected in series relation with the associated circuit breaker 5 by means of a suitable current transformer 24 and which is arranged to close its contacts 25 and effect the energization of the trip coil 12 independently of the operation of the associated time relay 21 when the current flowing through the circuit breaker 5 exceeds a predetermined value. Preferably, the overcurrent relays 23 are set so that they close their respective contacts 25 only in response to a relatively large flow of current through the respective feeder circuits.

The operation of the arrangement shown in the drawing is as follows: When the circuit breakers 5 and 6 in any feeder are open the associated relay 15 is preferably arranged in any suitable manner so that both of its contacts 19 and 20 are open. When the circuit breaker 6 in any feeder circuit is closed, the associated relay 15 operates to close its contacts 19 so that the closing coil 11 of the associated circuit breaker 5 is energized through the closed auxiliary contacts 27 on the circuit breaker 5 from the secondary of the transformer 4. As soon as the circut breaker 5 closes, the circuit of the closing coil 11 is opened at the auxiliary contacts 27 and the circuit breaker 5 is held in its closed position by the latch 13.

Whenever a primary circuit breaker 6 is opened either automatically or by hand reverse magnetizing current flows from the network 1 to the transformer 4 whose primary circuit is open. This reverse magnetizing current causes the associated power directional relay 15 to open its contacts 19 and close its contacts 20, thereby connecting the coil of the associated time relay 21 across the secondary winding of the transformer 4. After the time relay 21 has been energized for a predetermined length of time, it closes its contacts 22 and connects the trip coil 12 of the circuit breaker 5 across the secondary winding of the transformer 4 so that the circuit breaker 5 is opened. The energizing circuit of the trip coil 12 also includes the auxiliary contacts 28 on the circuit breaker 5.

When the circuit breaker 5 opens, it disconnects the transformer 4 from the network 1 and since no current flows through the current winding 17 of the power directional relay 15, this relay opens its contacts 20 and moves to its mid position. When the transformer 4 is reenergized the relay 15 closes its contacts 19 and effects the reclosing of the circuit breaker 5 in the manner above described.

In order to prevent pumping of the circuit breaker 5 each relay 15 is preferably provided with a holding winding 26 in series with its contacts 20 so that the relay cannot reclose its contacts 19 after the contacts 20 have been closed until the secondary voltage of the associated transformer 4 has decreased below a predetermined value.

In case of a fault on a feeder 3 or in the transformer 4 connected therein, an excessive current flows from the supply circuit 2 through the primary circuit breaker 6 in the faulty feeder circuit to the fault so that the overcurrent trip coil 9 associated with the circuit breaker 6 is energized sufficiently to effect the opening of the circuit breaker. Current is also fed to the fault from the network 1 and this reverse current causes the reverse power relay 15 associated with the faulty circuit to open its contacts 19 and close its contacts 20 and also causes the overcurrent relay 23 associated with the faulty circuit to close its contacts 25. When the contacts 20 and 25 are simultaneously closed, an energizing circuit is completed for the trip coil 12 to effect the opening of the circuit breaker 5 in the faulty feeder circuit.

Therefore, it will be observed that I have provided a simple arrangement for effecting the opening of a circuit breaker between the secondary winding of a transformer and the network after a predetermined time interval when the reverse power is below a predetermined value and in response to a much shorter time when the reverse power is above a predetermined value and for effecting the closing of the circuit breaker whenever the transformer secondary voltage is above a predetermined value.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In a system of electric distribution, two alternating current circuits, switching means for interconnecting said circuits, and means for effecting the opening of said switching means including a power directional relay responsive to the direction of power flow through said switching means, timing means controlled by said power direction relay for effecting the opening of said switching means when power flows through said switching means in a predetermined direction for a predetermined time, and overload responsive means for effecting the opening of said switching means independently of said timing means.

2. In a system of electric distribution, two alternating current circuits, switching means for interconnecting said circuits, and means for effecting the opening of said switching means including a power directional relay responsive to the direction of power flow through said switching means, a time relay controlled by said power directional relay for effecting the opening of said switching means when power flows through said switching means in a predetermined direction for a predetermined time, and means responsive to the current through said switching means and cooperating with said power directional means to effect the opening of said switching means independently of said time relay only when the power flow in said predetermined direction exceeds a predetermined value.

3. In a system of electric distribution, two alternating current circuits, a switch for connecting said circuits, and means for controlling the opening and closing of said switch including a power directional relay responsive to the direction of power flow through said switch when closed; means controlled by said power directional relay when said switch is open for effecting the closing of said switch in response to the voltage of one of said circuits, and timing means controlled by said power directional relay for effecting the opening of said switch when power flows to said one of said circuits from the other circuit for a predetermined time.

4. In a system of electric distribution, two alternating current circuits, a switch for connecting said circuits, and means for controlling the opening and closing of said switch including a power directional relay responsive to the direction of power flow through said switch when closed, means controlled by said power directional relay when said switch is open for effecting the closing of said switch in response to the voltage of one of said circuits, a time relay arranged when energized for a predetermined time to effect the opening of said switch, means controlled by said power directional relay for completing an energizing circuit for said time relay when current flows to said one of said circuits from the other of said circuits, and means responsive to a predetermined amount of power flow from said other circuit to said one of said circuits for effecting the opening of said switch independently of said time relay.

5. In a system of electric distribution, an alternating current feeder circuit, a load circuit, a transformer connected between said feeder and load circuits, a switch in the secondary circuit of said transformer, and means for controlling the opening and closing of said switch including a power directional relay responsive to the direction of power flow through said switch, means controlled by said power directional relay for effecting the closing of said switch when said transformer secondary is energized and said switch is open, and timing means controlled by said power directional relay for effecting the opening of said switch when power flows from said load circuit to said transformer for a predetermined time.

6. In a system of electric distribution, an alternating current feeder circuit, a load circuit, a transformer connected between said feeder and load circuits, a switch in the secondary circuit of said transformer, and means for controlling the opening and closing of said switch including a power directional relay responsive to the direction of power flow through said switch, means controlled by said power directional relay for effecting the closing of said switch when said transformer secondary is energized and said switch is open, and timing means controlled by said power directional relay for effecting the opening of said switch when power flows from said load circuit to said transformer for a predetermined time, an overload responsive means cooperating with said power directional relay for effecting the opening of said switch independently of said timing means when the amount of power flowing from said load circuit to said transformer exceeds a predetermined amount.

7. In a system of electric distribution, an alternating current feeder circuit, a load circuit, a transformer connected between said feeder and load circuits, a switch in the secondary circuit of said transformer, having a closing coil and a trip coil, an energizing circuit for said coils connected to the secondary of said transformer, a power directional relay responsive to the direction of power flow through said switch when closed, a time relay controlled by said power directional relay so that said time relay is energized when power flows from said load circuit to said transformer, contacts in the energizing circuit of said closing coil controlled by said power directional relay and contacts in the energizing circuit of said trip coil controlled by said time relay so that they are closed after power has flowed from said load circuit to said transformer for a predetermined time.

8. In a system of electric distribution, an alternating current feeder circuit, a load circuit, a transformer connected between said feeder and load circuits, a switch in the secondary circuit of said transformer having a closing coil and a trip coil, an energizing circuit for said coils connected to the secondary of said transformer, a power directional relay responsive to the direction of power flow through said switch when closed, a time relay controlled by said power directional relay so that said time relay is energized when power flows from said load circuit to said transformer, overload responsive means connected in said transformer secondary circuit, contacts in the energizing circuit of said closing coil controlled by said power directional relay, contacts in the energizing circuit of said trip coil controlled by said time relay so that they are closed after power has flowed from said load circuit to said transformer for a predetermined time, and contacts connected in parallel with the contacts controlled by said time relay and controlled by said overload responsive means so that they are closed when the power flowing through said switch exceeds a predetermined value.

9. In a system of electric distribution, an alternating current feeder circuit, a load circuit, a transformer connected between said feeder and load circuits, a switch in the secondary circuit of said transformer, having a closing coil and a trip coil, energizing circuits for said coils connected to the secondary of said transformer, a power directional relay responsive to the direction of power flow through said switch when closed, a time relay controlled by said power directional relay so that said time relay is energized when power flows from said load circuit to said transformer, overload responsive means connected in said transformer secondary circuit, contacts in the energizing circuit of said closing coil controlled by said power directional relay, contacts in the energizing circuit of said trip coil controlled by said time relay so that they are closed after power has flowed from said load circuit to said transformer for a predetermined time, and series connected contacts in a shunt circuit around the time relay controlled contacts in the energizing circuit of said trip coil and respectively controlled by said power directional relay and said overload responsive means so that said trip coil is energized independently of said time relay when the power flowing from the load circuit to the transformer exceeds a predetermined value.

In witness whereof, I have hereunto set my hand this 18th day of March, 1929.

DAVID K. BLAKE.